United States Patent
Akasaka et al.

Patent Number: 5,995,694
Date of Patent: Nov. 30, 1999

[54] WAVELENGTH DIVISION MULTIPLEX COMMUNICATION LINK FOR OPTICAL TRANSMISSION

[75] Inventors: Youichi Akasaka; Ryuichi Sugizaki, both of Ichihara, Japan

[73] Assignee: The Furukawa Electric Co., Ltd., Tokyo, Japan

[21] Appl. No.: 08/880,024

[22] Filed: Jun. 20, 1997

[30] Foreign Application Priority Data

Jun. 21, 1996 [JP] Japan ..................................... 8-181599

[51] Int. Cl.⁶ ..................................................... G02B 6/02
[52] U.S. Cl. ........................... 385/123; 385/126; 385/127
[58] Field of Search ..................................... 385/123–126

[56] References Cited

U.S. PATENT DOCUMENTS

| | | | |
|---|---|---|---|
| 5,042,906 | 8/1991 | Chesler et al. ........................... | 385/123 |
| 5,361,319 | 11/1994 | Antos et al. ............................. | 385/123 |
| 5,838,867 | 11/1998 | Onishi et al. ............................ | 385/123 |

OTHER PUBLICATIONS 1.1 Tb/s WDM Transmission over a 150km 1.3 μm Zero–dispersio Single–Mode Fiber; Onaka, Miyata, Ishikawa, Otsuka, Ooi, Kai, Seino, Nishimoto, and Chikama.

OFC/96 Technical Digest, Mar. 1996.

*Primary Examiner*—Phan T. H. Palmer
*Attorney, Agent, or Firm*—Lacasse & Associates; Randy W. Lacasse; Wesley L. Strickland

[57] ABSTRACT

The invention provides a wavelength division multiplex communication link for optical transmissions, which is able to provide a ultra high bit-rate wavelength division multiplex communication at a 1550 nm wavelength band using the existing 1300 nm band zero dispersion of a single mode fiber network. A dispersion compensating fiber DCF having a negative dispersion value at a 1550 nm wavelength band is connected to a single mode fiber SMF of the existing 1300 nm band zero dispersion of a single mode fiber network with a line length which compensates the dispersion slope of the single mode fiber to zero. And, a dispersion flat fiber which makes the dispersion slope zero is further connected, with a line length which makes the remaining dispersion value zero, to the terminal end of a connection link of the single mode fiber SMF and dispersion compensating fiber DCF, whereby both the dispersion slope of a single mode fiber and dispersion value thereof can be adjusted to be zero at the terminal end of the dispersion flat fiber DFF.

3 Claims, 1 Drawing Sheet

WAVELENGTH DIVISION MULTIPLEX COMMUNICATION LINK FOR OPTICAL TRANSMISSION

FIELD OF THE INVENTION

The present invention relates to a wavelength division multiplex communication link for optical transmission adapted in particular to ultra high bit-rate optical multiplex transmissions.

BACKGROUND OF THE INVENTION

A 1300 nm band zero dispersion single mode fiber network is well known as a fiber network of an optical transmission system. This fiber network is able to obtain almost zero dispersion transmissions at a receiving end by transmitting optical signals of a 1300 nm wavelength.

Recently, optical transmissions have been attempted at a wavelength band of around 1550 nm, which is an excitation band of an erbium doped fiber amplifier (EDFA). The EDFA was disposed in an optical transmission path, using an existing 1300 nm band zero dispersion single mode fiber network. Furthermore, many trials have been taken into consideration, wherein wavelength division multiplex transmissions are carried out at wide wavelength bands of around 1550 nm, aiming at a further high bit-rate transmission.

Single mode fiber in an existing 1300 nm band zero dispersion single mode fiber network has positive dispersion values and positive dispersion slope characteristics in which the dispersion quantity becomes large in accordance with an increase in wavelength. Therefore, in the instance where a wavelength division multiplex transmission is performed at a 1550 nm wavelength band using an existing zero dispersion 1300 nm single mode fiber network, the dispersion quantity is increases in line with an increase of the transmission distance of single mode fibers. Accordingly, the separation of multiplex-transmitted signals of each wavelength will be difficult, thereby causing a problem to arise in reliability of the wavelength division multiplex transmissions. Therefore, wavelength division multiplex transmissions have usually been attempted, using a communication link (transmission link) in which a dispersion compensating fiber having a large negative dispersion value and negative dispersion slope characteristics is connected to a single mode fiber.

OBJECTS AND SUMMARY OF THE INVENTION

In a case where a wavelength division multiplex transmission is carried out using an existing 1300 nm band zero dispersion single mode fiber network, if a wavelength division multiplex transmission is executed at a wavelength band of, for example, 1530 nm to 1560 nm, although a communication is carried out in a wavelength band of 1.55 μm, which is an excitation band of the abovementioned erbium doped fiber amplifier, a dispersion difference equivalent to 30 nm×dispersion slope×optical fiber length at maximum occurs between the wavelength division multiplex signal light to cause the transmission capacity to be subjected to limitations due to dispersion. This will be a hindrance in a high bit-rate wavelength division multiplex transmission.

In order to suppress such wavelength dispersion, in the instance where a dispersion compensating fiber is connected to a single mode fiber of an existing 1300 nm band zero dispersion single mode fiber network, if the dispersion of the core signal wavelength is adjusted to be zero at the full length, the dispersion value of the dispersion compensating fiber and the value of a dispersion slope will become merely one figure corresponding one to one to the dispersion value of the connection mating side single mode fiber and value of the dispersion slope thereof. In practice, the dispersion values of the respective single mode fiber used in the existing 1300 nm band zero dispersion single mode fiber network and dispersion slopes thereof are individually diversified, and in order to compensate for the dispersion of these diversified single mode fibers, dispersion compensating fibers suitable for each of the single mode fibers must be manufactured for connections. Therefore, in practice, the realization thereof is very difficult.

In order to simultaneously and completely compensate for the dispersion of a single mode fiber and dispersion slope thereof, it is necessary to meet an expression of $D_{SMF}/S_{SMF} = D_{DCF}/S_{DCF}$ wherein the dispersion value of a single mode fiber is $D_{SMF}$, the dispersion slope of the single mode fiber is $S_{SMF}$, the dispersion value of a dispersion compensating fiber is $D_{DCF}$, and the dispersion slope is $S_{DCF}$. Generally, it is very difficult to manufacture a dispersion compensating fiber so as to meet this condition, and in practice it is remarkably difficult to completely and simultaneously compensate the dispersion of the respective single mode fibers used in the existing 1300 nm band zero dispersion single mode fiber network and the dispersion slope thereof. This is an obstacle in performing an ultra high bit-rate wavelength division multiplex transmission using wavelengths in the vicinity of 1550 nm.

The invention was made in order to solve the abovementioned themes, and it is therefore an object of the invention to provide a wavelength division multiplex communication link for optical transmissions, which is able to completely and easily compensate, in the 1550 nm wavelength band, the dispersion value of a single mode fiber used in the existing 1300 nm band zero dispersion single mode fiber network and the dispersion slope thereof and enables an ultra high bit-rate optical multiplex transmission at the 1550 nm wavelength band.

As described above, although it is difficult to manufacture a fiber which simultaneously and completely compensates for the dispersion value of a single mode fiber and the dispersion slope thereof, it is possible to very easily make an adjustment so as to make zero only the dispersion value and the value of the dispersion slope, by adjusting the line length of a fiber for compensating the dispersion value and dispersion slope. The present applicant takes a note of this point, and attempts to compensate the dispersion value of a single mode fiber and dispersion slope thereof by a two-stage construction. That is, firstly, as the first stage, the first stage dispersion compensating fiber is connected to a single mode fiber, and, by adjusting the line length thereof, any one of the dispersion value or dispersion slope is adjusted to become zero. Next, the second-stage compensating fiber is connected thereto, and, by adjusting the line length thereof, the dispersion slope is compensated to become zero by a dispersion shift fiber having the reverse dispersion slope characteristics of the remaining dispersion slope in a link where the dispersion value is adjusted to be zero by the abovementioned first stage dispersion compensating fiber. In the link, the dispersion slope is adjusted to be zero by the abovementioned first stage dispersion compensating fiber, the dispersion value is adjusted to become zero by a dispersion flat fiber in which the dispersion value has a constant value with the dispersion slope made zero. Thus, the present invention has an object of compensating both the dispersion value of a single mode fiber and the dispersion slope thereof.

In order to achieve the abovementioned object, the invention is provided with the following means. That is, according to the first aspect of the invention, in an optical transmission system which compensates a dispersion at a 1550 nm optical transmission wavelength band by connecting a dispersion compensating fiber having a negative dispersion value at a wavelength of 1550 nm band to a single mode fiber of a 1300 nm band zero dispersion single mode fiber network having a zero dispersion at a 1300 nm band optical transmission wavelength, the construction is such that a dispersion compensating fiber having a line length $L_{DCF}$, which is able to roughly meet the condition of $S_{SMF} \times L_{SMF}/|S_{DCF}|=L_{DCF}$, is connected to the abovementioned single mode fiber wherein the dispersion slope at a 1550 nm wavelength band of the abovementioned single mode fiber is $S_{SMF}$, the dispersion value thereof is $D_{SMF}$, the line length is $L_{SMF}$, the dispersion slope at a 1550 nm wavelength band of the abovementioned dispersion compensating fiber is $S_{DCF}$, the dispersion value thereof is $D_{DCF}$, and the line length is $L_{DCF}$, and furthermore a dispersion flat fiber in which at a 1550 nm wavelength band the dispersion slope is almost zero and the dispersion value is $D_{DFF}$ is connected thereto with a line length $L_{DFF}$ which almost meets the condition of $D_{SMF} \times L_{SMF} + D_{DCF} \times L_{DCF} + D_{DFF} \times L_{DFF} = 0$.

Furthermore, according to the second aspect of the invention, in an optical transmission system which compensates the dispersion at a 1550 nm optical transmission wavelength band by connecting a dispersion compensating fiber to a single mode fiber of a 1300 nm band zero dispersion single mode fiber having a zero dispersion at a 1300 nm optical transmission wavelength band, the construction is such that, wherein the dispersion slope at a 1550 nm wavelength band of the abovementioned single mode fiber is $S_{SMF}$, the dispersion value thereof is $D_{SMF}$, the line length is $L_{SMF}$, the dispersion slope at a 1550 nm band of the abovementioned dispersion compensating fiber is $S_{DCF}$, the dispersion value thereof is $D_{DCF}$ and the line length is $L_{DCF}$, a dispersion compensating fiber of a line length $L_{DCF}$, which almost meets the condition of $D_{SMF} \times L_{SMF}/|D_{DCF}|=L_{DCF}$ is connected to the abovementioned single mode fiber and further a dispersion shift fiber in which the dispersion slope at a 1550 nm wavelength band is $S_{DSF}$ and the dispersion value thereof is almost zero is connected thereto with a line length $L_{DSF}$ which almost meets $S_{SMF} \times L_{SMF} + S_{DCF} \times L_{DCF} + S_{DSF} \times L_{DSF} = 0$.

With the first aspect of the invention, the dispersion slope is compensated to become zero by causing a dispersion compensating fiber of line length $L_{DCF}$ to be connected to a single mode fiber. Next, since a dispersion flat fiber in which the dispersion slope is zero (including almost zero) and the dispersion value is $D_{DFF}$ is connected to a link to which the single mode fiber and dispersion compensating fiber are connected, and the line length of the dispersion flat fiber is adjusted to $L_{DFF}$, the remaining dispersion value is compensated to be zero (including almost zero), whereby both the dispersion value of a single mode fiber and dispersion slope thereof are compensated by adjusting the line length of the abovementioned dispersion compensating fiber and dispersion flat fiber thereby to solve the prior problems.

That is, according to the first aspect of the invention, a dispersion compensating fiber is connected to a single mode fiber of the existing 1300 nm band zero dispersion single mode fiber network with such a line length where the dispersion slope becomes zero (including almost zero), and further a dispersion flat fiber is connected to a connection link of the single mode fiber and dispersion compensating fiber with such a line length where the dispersion slope is zero (including almost zero) and the dispersion remaining at the connection terminal of the abovementioned dispersion compensating fiber becomes zero (including almost zero), thereby causing the dispersion to be compensated to be zero (including almost zero), whereby the dispersion slope of a single mode fiber and dispersion value thereof are compensated to be zero (including almost zero) in total. Therefore, a communication link according to the first aspect of the invention is not influenced by any limitation of the transmission capacity due to dispersion, thereby a ultra high bit-rate wavelength division multiplex optical communication is achieved.

Furthermore, the dispersion slope of a single mode fiber and dispersion value thereof are compensated by adjusting the respective line lengths of a dispersion compensating fiber and dispersion flat fiber as described above, it becomes remarkably easy to compensate and adjust the dispersion slope and dispersion value. Therefore, even though the dispersion slope of single mode fibers and dispersion values used for the existing 1300 nm band zero dispersion single mode fiber network are diversified, it becomes easy to compensate both dispersion slopes and dispersion values of the individual single mode fibers to be zero, whereby it is possible to propose a very practical communication link which is able to solve the conventional problems at one stretch.

With the second aspect of the invention, the dispersion value can be compensated to be zero (including almost zero) by adjusting the line length with a dispersion compensating fiber of a line length $L_{DCF}$ connected to a single mode fiber. Next, a dispersion shift fiber in which the dispersion value is zero (including almost zero) is connected to a link to which both a single mode fiber and a dispersion compensating fiber are connected, wherein the remaining dispersion slope is compensated to be zero (including almost zero) by adjusting the line length. Thus, by both the dispersion compensating fiber and dispersion shift fiber being connected to a single mode fiber and the respective line lengths being adjusted, both the dispersion value of the single mode fiber and dispersion slope thereof are compensated to be zero (including almost zero), thereby the conventional problems can be solved.

That is, in the second aspect of the invention, a dispersion compensating fiber is connected to a single mode fiber of the existing 1300 nm band zero dispersion single mode fiber network at a line length where the dispersion value of the single mode fiber is made zero (including almost zero), and furthermore a dispersion shift fiber having a zero dispersion (including almost zero) around a wavelength of 1550 nm is connected to the connection link with such a line length where the dispersion slope remaining at the terminal of the abovementioned compensating fiber is compensated to be zero (including almost zero). Therefore, since both the dispersion slope and dispersion value can be compensated to be zero (including almost zero) at the terminal of a communication link (transmission link) to which a single mode fiber, dispersion compensating fiber and dispersion shift fiber are connected, a communication link according to the second aspect of the invention is not influenced by limitations of dispersion as in the abovementioned first aspect of the invention, and it becomes possible to obtain a ultra high bit-rate wavelength division multiplex communication.

Still furthermore, since the compensation of a dispersion value and a dispersion slope can be achieved by adjusting the line length of a dispersion compensating fiber and a dispersion shift fiber, it becomes remarkably easy to compensate and adjust the dispersion slope and dispersion value.

Even though the dispersion slope and dispersion value are individually diversified in the respective single mode fibers used in the existing 1300 nm band zero dispersion single mode fiber network as in the first aspect of the invention, it becomes possible to adjust both the dispersion slope and dispersion value of these individual single mode fibers to zero (almost zero). Therefore, the second aspect of the invention is also able to propose a communication link suitable for a practically ultra high bit-rate wavelength division multiplex communication.

Still furthermore, since, in both the first aspect and second aspect of the invention, it is possible to compensate both the dispersion slope and dispersion value to be zero at the terminal side of a communication link, it is possible to avoid influences due to dispersion limits resulting from a self-phase modulation. Therefore, a high reliability, high bit-rate and long distance wavelength division multiplex communication can be achieved.

BRIEF DESCRIPTION OF THE DRAWINGS

These and other objects and advantages of the present invention will become more apparent and more readily appreciated from the following detailed description of the exemplary embodiments of the invention, taken in conjunction with the accompanying drawings, in which.

DETAILED DESCRIPTION OF THE PREFERRED EMBODIMENT

Figure 1:
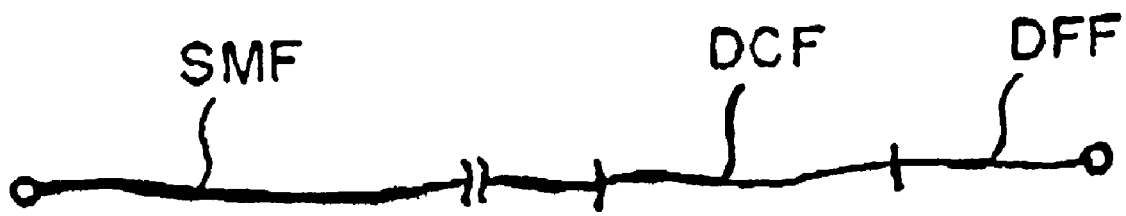
FIG. 1 is an explanatory view of a preferred embodiment according to the first aspect of the invention.

Hereinafter, a description will be given of preferred embodiments of the invention. FIG. 1 shows a preferred embodiment according to the first aspect of the invention. A communication line according to the preferred embodiment is such that a dispersion compensating fiber DCF having a negative dispersion value at a 1550 nm wavelength band is connected to a single mode fiber SMF of the existing 1300 nm zero band dispersion single mode fiber network, and a dispersion flat fiber DFF in which the dispersion slope is zero (almost zero) at a 1550 nm wavelength band is thereafter connected thereto.

The line length $L_{DCF}$ of a dispersion compensating fiber DCF is adjusted so as to roughly meet the following expression (1):

$$S_{SMF} \times L_{SMF}/|S_{DCF}| = L_{DCF} \quad (1)$$

wherein the dispersion slope at a 1550 nm wavelength band of the abovementioned single mode fiber SMF is $S_{SMF}$, dispersion value is $D_{SMF}$, line length is $L_{SMF}$, the dispersion slope at a 1550 nm wavelength band of the dispersion compensating fiber DCF is $S_{DCF}$, dispersion value is $D_{DCF}$ and line length is $L_{DCF}$.

By adjusting the line length $L_{DCF}$, the dispersion slope of the single mode fiber SMF is adjusted to be zero (including almost zero), and a state where a dispersion value still remains is produced.

Next, when the dispersion slope at a 1550 nm wavelength band of a dispersion flat fiber DFF is zero (including almost zero) and the dispersion value thereof is $D_{DFF}$, the line length $L_{DFF}$ of the dispersion flat fiber DFF is adjusted so as to roughly meet the following expression (2).

$$D_{SMF} \times L_{SMF} + D_{DCF} \times L_{DCF} + D_{DFF} \times L_{DFF} = 0 \quad (2)$$

By adjusting the line length $L_{DFF}$ so as to roughly meet the expression (2) and connecting the dispersion flat fiber DFF to the single mode fiber SMF and to the connection link of the dispersion compensating fiber DCF, the remaining dispersion value is adjusted to be zero (including almost zero), and it is possible to take out a signal, for which the dispersion value and dispersion slope are compensated to be zero, from the terminal end of the dispersion flat fiber.

Still furthermore, in the first aspect of the invention, the terminal side of a single mode fiber SMF, dispersion compensating fiber DCF and dispersion flat fiber DFF are respectively wound on individual reels, and the respective reels are coaxially overlapped to be disposed or juxtaposed on the same plane (for example, floor surface). The single mode fiber SMF, dispersion compensating fiber DCF and dispersion flat fiber DFF are connected by welding.

Figure 2:
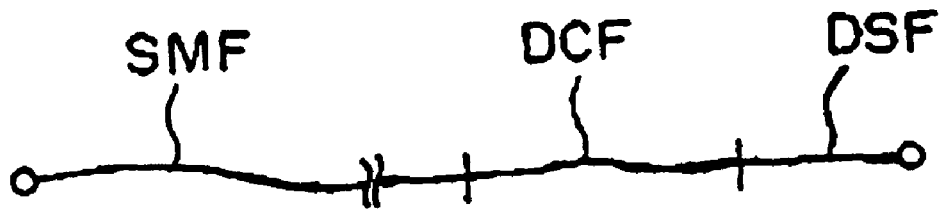
FIG. 2 is an explanatory view of a preferred embodiment according to the second aspect of the invention.

FIG. 2 shows another preferred embodiment according to the second aspect of the invention. The preferred embodiment is such that a dispersion compensating fiber DCF having a positive or negative dispersion value at a 1550 nm wavelength band is connected to a single mode fiber SMF of the existing 1300 nm band zero dispersion single mode fiber network, and a dispersion shift fiber DSF in which the dispersion value at a 1550 nm wavelength band is zero (including almost zero) is connected to this dispersion compensating fiber DCF.

The line length $L_{DCF}$ of the dispersion compensating fiber DCF is adjusted so as to roughly meet the following expression (3):

$$D_{SMF} \times L_{SMF}/|D_{DCF}| = L_{DCF} \quad (3)$$

wherein the dispersion slope at a 1550 nm wavelength band of the abovementioned single mode fiber is $S_{SMF}$, dispersion value is $D_{SMF}$, line length is $L_{SMF}$, and the dispersion slope at a 1550 nm wavelength band of the abovementioned compensating fiber is $S_{DCF}$, dispersion value is $D_{DCF}$ and line length is $L_{DCF}$.

By adjusting the line $L_{DCF}$ of the dispersion compensating fiber DCF so as to meet this expression (3), the dispersion value of a single mode fiber SMF is compensated to be zero (including almost zero), and a state where a slope value still remains is produced.

Next, the line length $L_{DSF}$ of a dispersion shift fiber DSF is adjusted so as to meet the following expression (4) wherein the dispersion slope at a 1550 nm wavelength band of the dispersion shift fiber is $S_{DSF}$, the dispersion value thereof is zero (including almost zero) and line length is $L_{DSF}$, and thereafter the dispersion shift fiber DSF is connected to the terminal end of the dispersion compensating fiber DCF.

$$S_{SMF} \times L_{SMF} + S_{DCF} \times L_{DCF} + S_{DSF} \times L_{DSF} = 0 \quad (4)$$

By adjusting the line length $L_{DSF}$ of the dispersion shift fiber DSF so as to roughly meet the abovementioned expression (4), the dispersion slope remaining in the link of the single mode fiber SMF and dispersion compensating fiber DCF is compensated to be zero (including almost zero). As a result, at the terminal end of the dispersion shift fiber DSF, it will be possible to take out a signal for which both the dispersion value of the single mode fiber SMF and dispersion slope thereof are compensated to be zero (including almost zero).

Still furthermore, also in the second aspect of the invention, since the terminal side of the single mode fiber SMF, dispersion compensating fiber DCF and dispersion shift fiber DSF are respectively wound on individual reels, the respective reels are coaxially overlapped and disposed, or are juxtaposed on the same plane (for example, floor surface). Furthermore, the single mode fiber, dispersion compensating fiber and dispersion shift fiber are connected to each other by welding.

Embodiment 1

This embodiment corresponds to the first aspect of the invention. As shown in FIG. 1, a dispersion compensating fiber DSF and a dispersion shift fiber DSF are connected to a single mode fiber SMF of the existing 1300 nm band zero dispersion single mode fiber network. The dispersion value $D_{SMF}$ of the single mode fiber SMF is 17 ps/nm·km at a wavelength of 1550 nm, the dispersion slope S SMF thereof is 0.058 ps/nm²·km at a wavelength of 1550 nm, and the line length $L_{SMF}$ is 42 km.

On the other hand, the dispersion value $D_{DCF}$ is −102 ps/nm·km at a 1550 nm wavelength of the dispersion compensating fiber DCF, the dispersion slope $S_{DCF}$ is −0.406 ps/nm²·km at a 1550 nm wavelength band, and the line length $L_{DCF}$ thereof is 6 km. Furthermore, the dispersion value $D_{DFF}$ is −6 ps/nm·km at a 1550 nm wavelength of the dispersion flat fiber DFF, the dispersion slope $S_{DFF}$ is zero at a 1550 nm wavelength band, and the line length $L_{DFF}$ thereof is 17 km.

In the abovementioned expression (1), where $S_{SMF}$ is substituted by 0.058 ps/nm²·km, $L_{SMF}$ by 42 km, $S_{DCF}$ is −0.406 ps/nm²·km, respectively, $L_{DCF}$ becomes equal to 6.0 km. Therefore, the line length $L_{DCF}$ of the dispersion compensating fiber DCF meets the abovementioned expression (1).

In a case where a wavelength division multiplex communication is carried out at a wavelength of 1530 nm to 1560 nm of the 1550 nm wavelength band, since the dispersion value D' slipped ΔF from the reference wavelength F is expressed (ΔF=F'−F) by D'=$D_0$+$S_0$ (F'−F) when the dispersion value at the reference wavelength is $D_0$ and the dispersion slope at the wavelength band $S_0$, the dispersion value at a wavelength of 1530 nm of a single mode fiber SMF is 15.84 ps/nm·km and the dispersion value at a wavelength of 1560 nm is 17.58 ps/nm·km. Therefore, the dispersion value resulting from a propagation over the line length 42 km of the single mode fiber SMF is 665.28 ps/nm at a wavelength of 1530 nm, 714.00 ps/nm at a wavelength of 1550 nm, and 738.36 ps/nm at a wavelength of 1560 nm.

Since the dispersion value at a wavelength of 1530 nm of the dispersion compensating fiber DCF is −93.88 ps/nm·km and is −106.06 ps/nm·km at a wavelength of 1560 nm, the dispersion value after the propagation over the line length 6 km becomes −563.28 ps/nm at a wavelength of 1530 nm, −612.00 ps/nm at a wavelength of 1550 nm and −636.36 ps/nm at a wavelength of 1560 nm.

Therefore, the dispersion value at the terminal of a propagation over a 42 km long single mode fiber SMF and a 6 km long dispersion compensating fiber DCF becomes constant (102.00 ps/nm) at wavelengths of 1530 nm to 1560 nm, and the dispersion value is made flat at a constant value (102.00 ps/nm), and the dispersion slope is adjusted to be zero.

Since the dispersion slope at a 1550 nm wavelength band of a dispersion flat fiber to be connected to a connection link of the single mode fiber SMF and dispersion compensating fiber DCF is zero and the dispersion value at a 1550 nm wavelength is −6 ps/nm·km, the dispersion values at the respective wavelengths (1530 nm to 1560 nm) propagated over a line length 17 km becomes −102.00 ps/nm in either case. Resultantly, the dispersion value 102.00 ps/nm of each wavelength at a 1550 nm wavelength band, which remains at the terminal end of the dispersion compensating fiber DCF is completely compensated by the dispersion value −102.00 ps/nm which is produced over the total length 17 km of the dispersion flat fiber DFF, whereby a signal for which both the dispersion slope and dispersion value at a 1550 nm wavelength band become zero can be taken out at the terminal end of a dispersion flat fiber DFF. The results of these calculations of the dispersion values in each fiber propagation are shown in Table 1.

TABLE 1

| Wavelength nm | SMF (ps/nm) | DCF (ps/nm) | SMF + DCF (ps/nm) | DFF (ps/nm) | SMF + DCF + DFF (ps/nm) |
|---|---|---|---|---|---|
| 1530 | 665.28 | −563.28 | 102.00 | −102.00 | 0 |
| 1550 | 713.00 | −612.00 | 102.00 | −102.00 | 0 |
| 1560 | 738.36 | −636.36 | 102.00 | −102.00 | 0 |

Furthermore, the values of $D_{SMF}$, $L_{SMF}$, $D_{DCF}$, $L_{DCF}$, $D_{DFF}$, and $L_{DFF}$ are substituted in the abovementioned expression (2) with respect to the respective wavelengths, 1530 nm, 1550 nm, and 1560 nm. The results of the calculations of the left side thereof become zero in either case, and it is confirmed that the abovementioned expression (2) is satisfied.

Embodiment 2

This preferred embodiment also corresponds to the first aspect of the invention. As in the abovementioned embodiment 1, a dispersion compensating fiber DCF in which the dispersion value $D_{DCF}$ is −102.0 ps/nm·km at a wavelength of 1550 nm and the dispersion slope $S_{DCF}$ at the wavelength band is −0.290 ps/nm²·km is connected, with a line length 8.4 km, to a single mode fiber SMF in which the dispersion value $D_{SMF}$ is 17 ps/nm·km at a wavelength of 1550 nm, the dispersion slope $S_{SMF}$ is 0.058 ps/nm²·km at the same wavelength of 1550 nm and the line length $L_{SMF}$ is 42 km, so that the dispersion slope of the abovementioned single mode fiber SMF becomes zero. Furthermore, a dispersion flat fiber DFF in which the dispersion slope $S_{DFF}$ at a 1550 nm wavelength band is zero, the dispersion value $D_{DFF}$ at a wavelength of 1550 nm is 10 ps/nm·km is further connected to the terminal end thereof. Also, in this embodiment, by substituting 0.058 ps/nm²·km for $S_{SMF}$, 42 km for $L_{SMF}$, and −0.290 ps/nm²·km for S DCF in the abovementioned expression (1), $L_{DCF}$ becomes 8.4 km, wherein the abovementioned expression (1) is sufficiently satisfied. Furthermore, if 15.84 ps/nm·km, 17 ps/nm·km or 17.58 ps/nm·km is substituted for the value of $D_{SMF}$ at the left side of the expression (2) with each corresponding to a wavelength of 1530 nm, 1550 nm or 1560 nm, $L_{SMF}$ is substituted by 42 km, −96.2 ps/nm·km, −102.0 ps/nm·km, or −104.9 ps/nm·km is substituted for the value of $D_{DCF}$ with each corresponding to a wavelength of 1530 nm, 1550 nm or 1560 nm, 8.4 km is substituted for $L_{DCF}$, 10 ps/nm·km is substituted for $D_{DFF}$, and 14.28 km is substituted for $L_{DFF}$, respectively, the results of the calculations of the left side at each wavelength become zero, whereby the abovementioned expression is sufficiently satisfied. Table 2 shows the results of calculations of dispersion at each fiber propagation in the preferred embodiment 2.

TABLE 2

| Wavelength nm | SMF (ps/nm) | DCF (ps/nm) | SMF + DCF (ps/nm) | DFF (ps/nm) | SMF + DCF + DFF (ps/nm) |
|---|---|---|---|---|---|
| 1530 | 665.28 | −808.08 | −142.80 | 142.80 | 0 |
| 1550 | 714.00 | −856.80 | −142.80 | 142.80 | 0 |
| 1560 | 738.36 | −881.16 | −142.80 | 142.80 | 0 |

In this embodiment, it can be confirmed that, at the terminal end of a dispersion flat fiber DFF, a signal for which the dispersion value and dispersion slope become zero at a wavelength of 1550 nm is taken out.

Embodiment 3

This embodiment corresponds to the second aspect of the invention. A dispersion compensating fiber DCF having a dispersion value $D_{DCF}=-102$ ps/nm·km at a wavelength of 1550 nm and a dispersion slope $S_{DCF}=0.406$ ps/nm²·km at a wavelength of 1550 nm is connected, with a line length $L_{DCF}=7$ km, to a single mode fiber SMF having a dispersion value DSMF=17 ps/nm·km at a wavelength of 1550 nm of the existing 1300 nm band zero dispersion single mode fiber network, a dispersion slope $S_{SMF}=0.058$ ps/nm²·km at a wavelength of 1550 nm and a line length $L_{SMF}=42$ km, so that the dispersion value becomes zero, and a dispersion shift fiber DSF having a dispersion slope $S_{DSF}=0.08$ ps/nm²·km at a wavelength of 1550 nm and a dispersion value $D_{DSF}=0$ ps/nm·km at a wavelength of 1550 nm is further connected to the terminal thereof so that the line length $L_{DCF}$ becomes 5.075 km.

By substituting 17 ps/nm·km for $D_{SMF}$, 42 km for $L_{SMF}$, and −102 ps/nm·km for $D_{DCF}$ in the abovementioned expression (3) using a wavelength of 1550 nm as the reference, the calculation result of the left side of expression (3) becomes $L_{DCF}=7.0$ km, and the condition of expression (3) is satisfied. Furthermore, since the dispersion value of a single mode fiber SMF is $D_{SMF}=15.74$ ps/nm·km at a wavelength of 1530 nm and the dispersion value is 31 93.88 ps/nm·km at a wavelength of 1530 nm of a dispersion compensating fiber DCF, these are substituted in the expression (3). Therefore, the line length $L_{DCF}$ of the dispersion compensating fiber becomes 7.086 km. Furthermore, the dispersion value $D_{SMF}$ of a single mode fiber at a wavelength of 1560 nm is 17.58 ps/nm·km and the dispersion value $D_{DCF}$ of a dispersion compensating fiber at the same wavelength of 1560 nm is −106.06 ps/nm·km. Therefore, by substituting these values in the expression (3), the line length $L_{DCF}$ of the dispersion compensating fiber DCF at a wavelength of 1560 nm becomes 6.962 km, and the line length $L_{DCF}$ of the dispersion compensating fiber, which can be obtained by the expression (3) is about 7 km. Therefore, at each of the wavelengths of 1530 nm to 1560 nm, the abovementioned expression (3) is satisfied.

Furthermore, by respectively substituting 0.058 ps/nm²·km for $S_{SMF}$, 42 km for $L_{SMF}$, −0.406 ps/nm²·km for $S_{DCF}$, 7 km for $L_{DCF}$, 0.08 ps/nm²·km for $S_{DSF}$ and 5.075 km for $L_{DSF}$ in the expression (4), the calculation results become zero and the expression (4) is satisfied.

Furthermore, Table 3 shows the dispersion values at each fiber propagation in the embodiment 3, wherein both the dispersion value and dispersion slope become zero at the terminal end of the dispersion shift fiber DCF. Accordingly, it can be proven that both the dispersion value of the single mode fiber and dispersion slope thereof are completely compensated.

TABLE 3

| Wavelength nm | SMF (ps/nm) | DCF (ps/nm) | SMF + DCF (ps/nm) | DFF (ps/nm) | SMF + DCF + DFF (ps/nm) |
|---|---|---|---|---|---|
| 1530 | 665.28 | −657.16 | 8.12 | −8.12 | 0 |
| 1550 | 714.00 | −714.00 | 0 | 0 | 0 |
| 1560 | 738.36 | −742.42 | −4.06 | 4.06 | 0 |

Embodiment 4

This embodiment also corresponds to the second aspect of the invention. With this embodiment, such a transmission link can be obtained, where as regards a single mode fiber SMF of the existing 1300 nm band zero dispersion single mode fiber network, the dispersion value $D_{SMF}$ is 17 ps/nm·km at a wavelength of 1550 nm, the dispersion slope $S_{SMF}$ is 0.058 ps/nm²·km at a 1550 nm wavelength band, and the line length $L_{SMF}$ is 42 km. A dispersion compensating fiber DCF in which the dispersion $D_{DCF}$ is −102 ps/nm·km at a wavelength of 1550 nm, the dispersion slope SDCF is −0.290 ps/nm²·km at the same wavelength is connected, with a line length $L_{DCF}=7$ km, to the abovementioned single mode fiber SMF, so that the dispersion value at the terminal end thereof becomes zero, and a dispersion shift fiber DSF in which the dispersion slope $S_{DSF}$ is −0.1 ps/nm²·km at a wavelength of 1550 nm and the dispersion value $D_{DSF}$ is 0 ps/nm·km at a wavelength of 1550 nm is further connected, with a line length $L_{DSF}=4.06$ km, to the terminal end of the dispersion compensating fiber DCF.

In the embodiment 4, by substituting 17 ps/nm·km for $D_{SMF}$, 42 km for $L_{SMF}$, and −102 ps/nm·km for $D_{DCF}$ in the abovementioned expression (3), the line length $L_{DCF}$ of a dispersion compensating fiber DCF is 7 km in order to make the dispersion value zero at a wavelength of 1550 nm. Therefore, the expression (3) is satisfied. Furthermore, the line length $L_{DCF}$ obtained by the expression (3) becomes 6.916 km by substituting 15.84 ps/nm·km for $D_{SMF}$ and −96.2 ps/nm·km for $D_{DCF}$ at wavelength of 1530 nm, and further $D_{SMF}$ becomes 17.58 ps/nm·km and $D_{DCF}$ becomes −104.9 ps/nm·km at a wavelength of 1560 nm. By substituting these values in the expression (3), the line length $L_{DCF}$ becomes 7.039 km. Therefore, in either wavelength of 1530 nm or 1560 nm, the line length $L_{DCF}$ obtained by the expression (3) becomes 7 km which is almost equal to the line length at a wavelength of 1550 nm. Accordingly, the line length $L_{DCF}$ obtained for the respective wavelengths at a wavelength of 1550 nm can almost meet the expression (3).

Furthermore, by substituting 0.058 ps/nm²·km for $S_{SMF}$, 42 km for $L_{SMF}$, −0.290 ps/nm²·km for $S_{DCF}$, 7 km for $L_{DCF}$, −0.01 ps/nm²·km for $S_{DSF}$, and 4.06 km for $L_{DSF}$, the calculation result of the left side of the expression (4) becomes zero to meet the abovementioned expression (4). Still furthermore, Table 4 shows the calculation results of dispersion at each fiber propagation in this embodiment. At the terminal end of the dispersion shift fiber DCF, since both the dispersion slope and dispersion value become zero, it can be confirmed that the dispersion value of the single mode fiber SMF and dispersion slope thereof are completely compensated.

TABLE 4

| Wavelength nm | SMF (ps/nm) | DCF (ps/nm) | SMF + DCF (ps/nm) | DFF (ps/nm) | SMF + DCF + DFF (ps/nm) |
|---|---|---|---|---|---|
| 1530 | 665.28 | −673.40 | −8.12 | 8.12 | 0 |
| 1550 | 714.00 | −714.00 | 0 | 0 | 0 |
| 1560 | 738.36 | −734.30 | −4.06 | −4.06 | 0 |

Since an optical transmission path of only the abovementioned single mode fiber has a dispersion value of 17 ps/nm·km at a wavelength of 1550 nm and a dispersion slope of 0.058 ps/nm²·km at a 1550 nm wavelength band, the same has a dispersion value of 15.84 ps/nm·km at a wavelength of 1530 nm for every line length of 1 km and a dispersion value of 17.58 ps/nm·km for every line length of 1 km at a wavelength of 1560 nm. Therefore, the difference of dispersion between two wavelengths (1530 nm and 1560 nm) is made large (1.74 ps/nm·km), and the optical transmission path has a large dispersion value at each of the respective wavelengths. Therefore, a large limitation will be given to the signal capacity by this dispersion.

Furthermore, in an optical transmission link in which a dispersion compensating fiber DCF having, for example, a dispersion value of −85.0 ps/nm·km at a wavelength of 1550 nm and a dispersion slope of −0.11 ps/nm²·km at a 1550 nm wavelength band is connected to a single mode fiber SMF having the abovementioned characteristics, the total dispersion value is 0 ps/nm·km, and the dispersion slope is 0.08 ps/nm²·km, a difference in the dispersion value, which is 2.4 ps/nm·km is produced between a signal of 1530 nm and that of 1560 nm for every line length of 1 km, thereby the optical transmission capacity will be given a limitation as in the above.

To the contrary, in each of the abovementioned preferred embodiments according to the invention, since a dispersion compensating fiber is connected to a single mode fiber, either one of the dispersion slope or dispersion value is compensated to be zero (including almost zero), a dispersion shift fiber is further connected thereto, and the remaining dispersion value or dispersion slope is compensated to be zero while the dispersion slope or dispersion value compensated to be zero is kept as it is zero, the dispersion value and dispersion slope at the terminal end of the dispersion shift fiber become zero at each of the wavelengths of a 1550 nm wavelength band. Therefore, the difference in dispersion value between the respective wavelengths accordingly becomes zero. Thereby, a ultra high bit-rate wavelength division multiplex optical communication can be achieved without any limitation in the transmission capacity due to dispersion.

Still furthermore, in order to increase the signal light noise ratio (SNR), for example, a signal power PS may be increased. However, if the signal power PS is increased, there will cause another problem that a spectral spread due to the self-phase modulation SPM, which is a non-linear effect of an optical fiber, deteriorates a waveform with respect to the dispersion of fibers. The dispersion limit when this self-phase modulation becomes a problem is given by the following expression (5).

$$B^3 L^3 D \leq 1.5 \times 10^{10} \times Z^2 \; exp \, (-\alpha Z)/\{1 - exp \, (-\alpha Z)\} \quad (5)$$

wherein B is an optical transmission rate, L is a line length (transmission path length) of an optical fiber, D is a dispersion value of a fiber, Z is a relay interval and α is a transmission path loss.

Through a calculation using the expression (5), a limitation arises in the wavelength division multiplex communication capacity at a middle distance at wavelength dispersion of 3 ps/nm·km. However, with the invention, as described in the preferred embodiments, since both the wavelength dispersion and dispersion slope are compensated to be zero (including almost zero), D≈0 is established in the abovementioned expression (5), wherein the expression (5) is satisfied regardless of the transmission path length L, and such an effect can be obtained where it is possible to avoid influences due to the dispersion limits resulting from the self-phase modulation.

Furthermore, the invention is not limited to the above preferred embodiments and examples. It is needless to say that various modifications and variations are available without departing from the spirits of the invention and scope thereof. For example, although in the first preferred embodiment and example, a dispersion compensating fiber DCF is connected to a single mode fiber SMF and a dispersion flat fiber DFF is further connected to this connection link, the connection order of the dispersion compensating fiber and dispersion flat fiber may be reversed.

Furthermore, although in the second preferred embodiment and example, a dispersion compensating fiber DCF is connected to a single mode fiber SMF and a dispersion shift fiber is further connected to this connection link, the connection order of the dispersion compensating fiber DCF and dispersion shift fiber DSF may be reversed.

What is claimed is:

1. A wavelength division multiplex communication link of an optical transmission system for compensating dispersion at a 1550 nm optical transmission wavelength band comprising a dispersion compensating fiber having a negative dispersion value at a 1550 nm wavelength band coupled with a single mode fiber of a 1300 nm band zero dispersion of a single mode fiber network having zero dispersion at a 1300 nm optical transmission wavelength band, wherein the dispersion compensating fiber has a line length $L_{DCF}$ substantially satisfying a condition $$S_{SMF} \times L_{SMF}/|S_{DCF}|=L_{DCF},$$

the dispersion slope at a 1550 nm wavelength band of said single mode fiber is $S_{SMF}$, the dispersion value thereof is $D_{SMF}$, and line length is $L_{SMF}$, and the dispersion slope at a 1550 nm wavelength band of said dispersion compensating fiber is $S_{DCF}$, dispersion value thereof is $D_{DCF}$, and line length is $L_{DCF}$, and a dispersion flat fiber in which the dispersion slope at a 1550 nm wavelength band is substantially zero and the dispersion value is made $D_{DFF}$ is further connected thereto with a line length $L_{DFF}$ substantially satisfying a condition $D_{SMF} \times L_{SMF} + D_{DCF} \times L_{DCF} + D_{DFF} \times L_{DFF} = 0$.

2. A wavelength division multiplex communication link of an optical transmission system for compensating dispersion at a 1550 nm optical transmission wavelength band comprising: a dispersion compensating fiber coupled to a single mode fiber of an 1300 nm band zero dispersion of a single mode fiber network having zero dispersion at a 1300 nm optical transmission wavelength band, wherein a dispersion compensating fiber has a line length $L_{DCF}$ substantially satisfying a condition $D_{SMF} \times L_{SMF}/|D_{DCF}|=L_{DCF}$ and wherein the dispersion slope at a 1550 nm wavelength band of said single mode fiber is $S_{SMF}$, the dispersion value thereof is $D_{SMF}$, and line length is $L_{SMF}$, and the dispersion slope at a 1550 nm wavelength band of said dispersion compensating fiber is $S_{DCF}$, dispersion value thereof is $D_{DCF}$, and line length is $L_{DCF}$, and a dispersion shift fiber in which the dispersion slope at a 1550 nm wavelength band is $S_{DSF}$ and the dispersion thereof is made substantially zero is further connected thereto with a line length $L_{DCF}$ substantially satisfying a condition of $S_{SMF} \times L_{SMF} + S_{DCF} \times L_{DCF} + S_{DSF} \times L_{DSF} = 0$.

3. A wavelength division multiplex communication link of an optical transmission system for compensating dispersion of an optical transmission at a wavelength band of about 1550 nm comprising:

a dispersion compensating fiber having a negative dispersion value at a wavelength band of 1550 nm;

a single mode optical fiber of a single mode fiber network having zero dispersion at a wavelength of 1300 nm with a line length which compensates the dispersion slope of the single mode fiber to substantially zero, coupled with the disperson compensating fiber;

and, a dispersion flat fiber for providing substantially zero dispersion slope when connected thereto, with a line length which makes the remaining dispersion value substantially zero, to the terminal end of a connection link of the single mode fiber and dispersion compensating fiber, whereby both the dispersion slope of a single mode fiber and dispersion value thereof are adjusted to be substantially zero at the terminal end of the dispersion flat fiber.

* * * * *